United States Patent
Taniguchi et al.

(10) Patent No.: US 7,587,006 B2
(45) Date of Patent: Sep. 8, 2009

(54) RECEIVING APPARATUS

(75) Inventors: Tomohiko Taniguchi, Osaka (JP); Keiichi Toiyama, Mino (JP); Kazuya Ueda, Hirakata (JP)

(73) Assignee: Panasonic Corporation, Osaka (JP)

( * ) Notice: Subject to any disclaimer, the term of this patent is extended or adjusted under 35 U.S.C. 154(b) by 587 days.

(21) Appl. No.: 10/568,776

(22) PCT Filed: Jul. 22, 2005

(86) PCT No.: PCT/JP2005/013480

§ 371 (c)(1),
(2), (4) Date: Feb. 21, 2006

(87) PCT Pub. No.: WO2006/011423

PCT Pub. Date: Feb. 2, 2006

(65) Prior Publication Data

US 2006/0286948 A1    Dec. 21, 2006

(30) Foreign Application Priority Data

Jul. 28, 2004    (JP)    ............................. 2004-219740

(51) Int. Cl.
*H04B 7/10* (2006.01)

(52) U.S. Cl. ...................................... 375/347

(58) Field of Classification Search ................. 374/347; 375/347, 144, 148

See application file for complete search history.

(56) References Cited

U.S. PATENT DOCUMENTS 6,058,138 A * 5/2000 Fukumasa et al. ............ 375/130

FOREIGN PATENT DOCUMENTS

| JP | 07-050627 | 2/1995 |
| JP | 09-312602 | 12/1997 |
| JP | 2000-022613 | 1/2000 |
| JP | 2000-209145 | 7/2000 |
| JP | 2001-156689 | 6/2001 |

OTHER PUBLICATIONS

Brennan, C.G., "Linear Diversity Combining Techniques," Proceedings of the IEEE, vol. 91, No. 2, Feb. 2003.

* cited by examiner

*Primary Examiner*—Kevin Y Kim
(74) *Attorney, Agent, or Firm*—Steptoe & Johnson LLP

(57) ABSTRACT

A receiving device receives by multiple antennas a signal carrier-modulated with digital multivalued modulation, compares the distance between received signal points with a threshold preliminarily stored, to select complex signals to be synthesized when demodulating, and adjusts a ratio for synthesizing to correct likelihood for error correction. With such a makeup, a receiving device is provided that is resistant to a noise signal to ensure a favorable reception state.

15 Claims, 8 Drawing Sheets

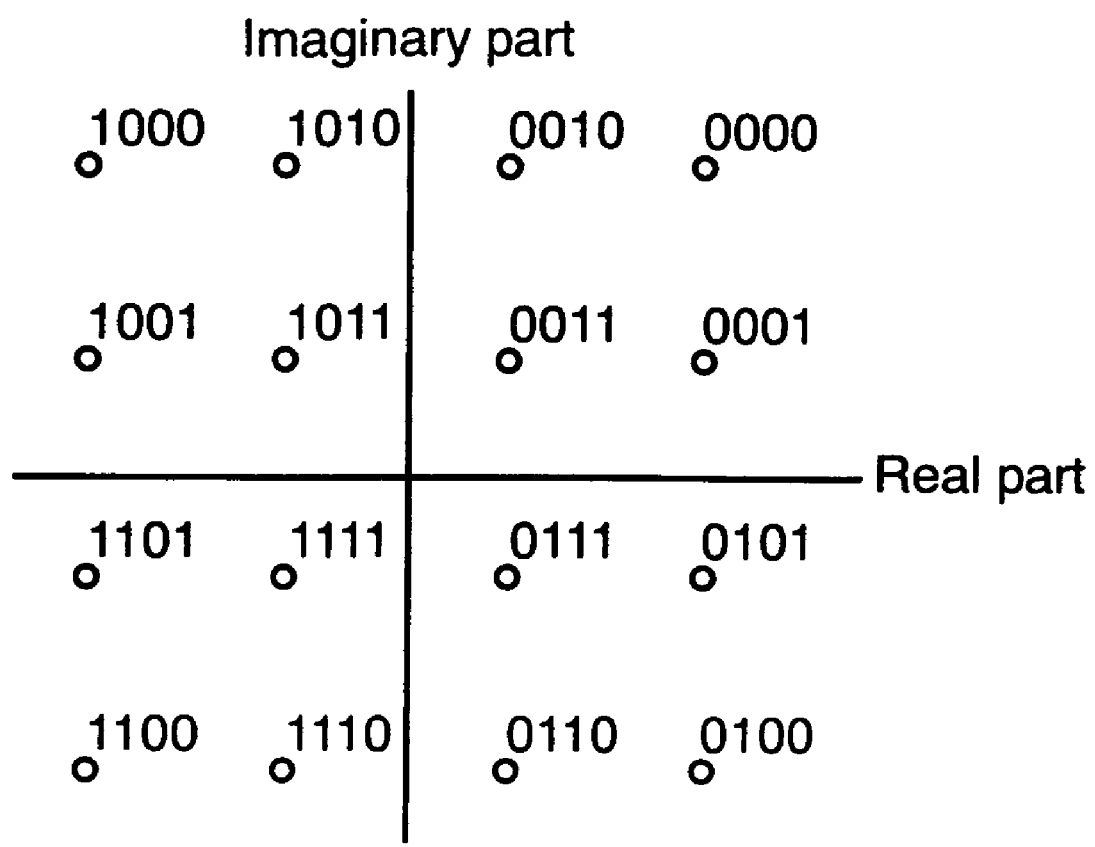

× Received signal point
○ 16QAM mapping point
□ Transmitted signal point

× Received signal point
○ 16QAM mapping point
□ Transmitted signal point

× Received signal point
○ 16QAM mapping point
□ Transmitted signal point

× Received signal point
○ 16QAM mapping point
□ Transmitted signal point

× Received signal point
○ 16QAM mapping point
□ Transmitted signal point
△ Received point Y"
  after synthesizes A through D
◎ Received point Y'"
  after synthesizes B through D

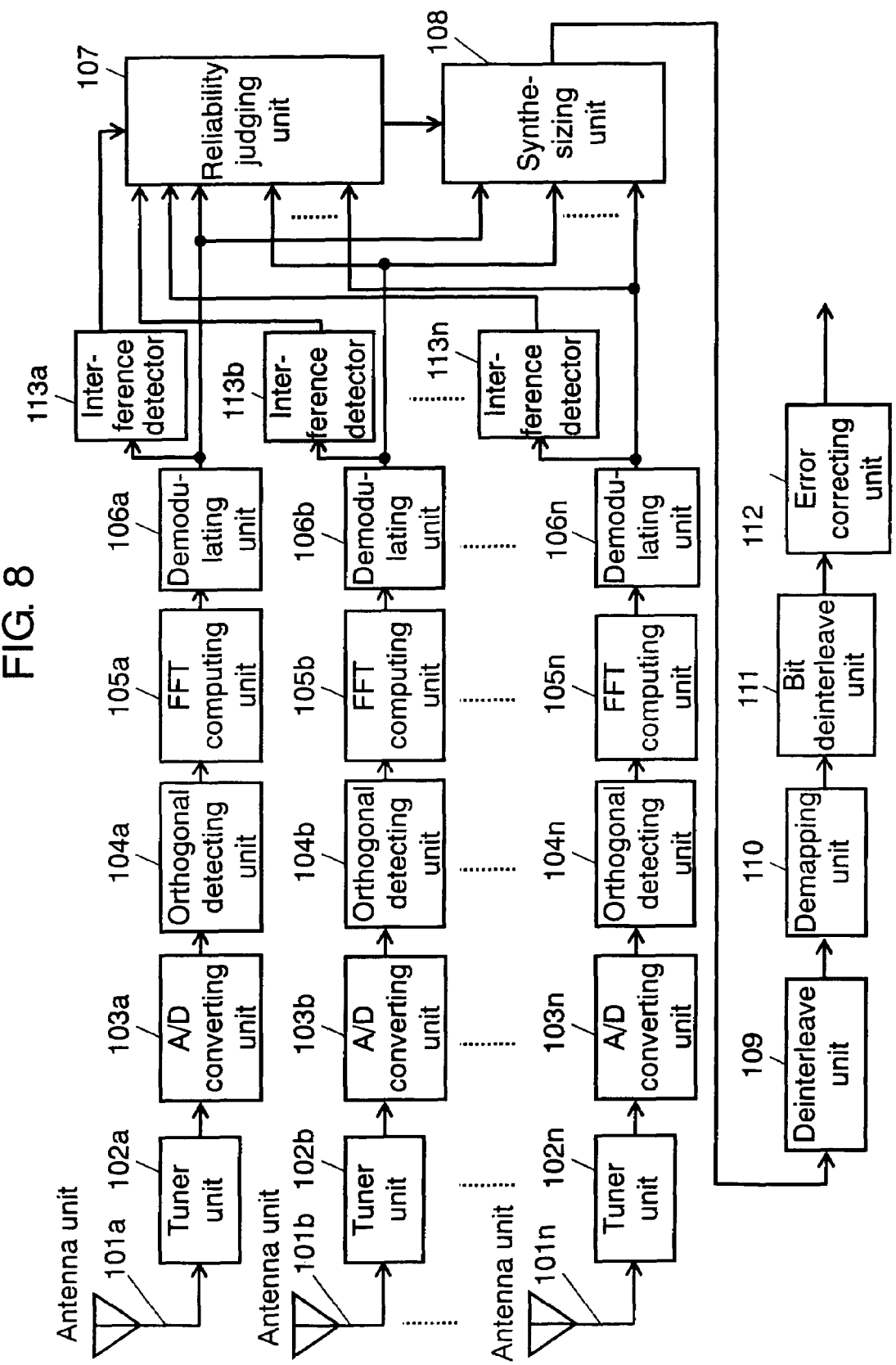

US 7,587,006 B2

RECEIVING APPARATUS

This application claims priority under 35 USC 371 of International Application No. PCT/JP2005/013480, filed on July 22, 2005, which claims priority of Japanese Patent Application No. 2004-219740, filed on July 28, 2004, the entire contents of both of which are hereby incorporated by reference.

TECHNICAL FIELD

The present invention relates to a receiving device that performs diversity reception of data signal series modulated and demodulated with digital multivalued modulation.

BACKGROUND ART

Diversity reception is widely used to stably receive terrestrial broadcasting on a mobile object such as an automobile or mobile telephone set.

Diversity reception method includes space diversity, which utilizes the difference in spatial arrangement between transmitting and receiving antennas; time diversity, which improves reception probability by transmitting the same signal multiple times; frequency diversity, which transmits the same signal in multiple frequency bands and utilizes the characteristic in which fading occurs differently depending on a frequency band, aiming at stable reception in any of the bands; and polarization diversity, which utilizes the difference in polarization characteristic among transmission signals.

Out of these methods, time diversity, frequency diversity, and polarization diversity require the transmission side to transmit the same information by multiple times or with multiple means. Accordingly, in order to improve reception characteristic for terrestrial broadcasting, space diversity is widely used that is implemented by changing the reception configuration at the receiving side for effectively utilizing the limited frequency resources.

When performing mobile reception of analog TV broadcasting on an automobile, for instance, space diversity reception is in practical use in which multiple antennas are set on an automobile to select an input signal with the highest level of received signal out of multiple received signals available.

Meanwhile, digitization of broadcasting is being promoted currently. In Japan and Europe, for example, Orthogonal Frequency Division Multiplexing (referred to as "OFDM" hereinafter) has been adopted as a terrestrial digital television broadcasting system.

Transmission data to be OFDM-modulated and transmitted undergoes information source coding based on MPEG2 information source coding.

An error correction process is performed to improve reception error tolerance when receiving signals. Further, changing carrier modulation method to that with higher error immunity improves error tolerance as well. Changing carrier modulation method from the modulation method called 64QAM to that called 16QAM, for example, improves noise immunity of a signal although the information rate of the signal to be transmitted decreases.

When applying space diversity reception for the signal OFDM-modulated mentioned above, multiple signals are received by multiple antennas and undergo A/D conversion, synchronous detection, FFT computing, and a demodulation process, for each received signal individually. Consequently, an OFDM signal composed of a large number of carriers is generated for each signal received by multiple antennas.

In space diversity reception, processing signals received by multiple antennas in the unit of OFDM carrier is most effective. More specifically, one optimum signal is selected from signals received by multiple antennas for each OFDM carrier, or signals received by multiple antennas are synthesized for each OFDM carrier.

When selecting one optimum signal, the power amount of an OFDM carrier, for example, is to be a selection criterion. In other words, the power amounts are compared for each OFDM carrier and the largest one is selected.

When synthesizing signals, a weighting amount is calculated for multiple signals obtained, for each OFDM carrier, and the signal are added according to a ratio calculated from the weighting amount. In this case, if the method called maximum ratio combining diversity reception is used, in which weighting is made according to the ratio of the power amount for each OFDM carrier, the noise amount for the signal can be minimized, and thus the reception characteristic is highly improved. Maximum ratio combining diversity reception is disclosed in the nonpatent literature "Linear Diversity Combining Techniques" Proc. IRE, 471075-1102, June 1959, by D. G. Brennan.

As mentioned above, if diversity reception method is used that demodulates multiple signals OFDM-modulated received by multiple antennas are to an OFDM carrier for each received signal, and selects or synthesizes the OFDM carriers obtained by the number of antennas, the power amount of an OFDM carrier is used as a selection criterion when selecting or a calculation criterion for a synthesizing ratio when synthesizing.

The power amount of an OFDM carrier is calculated from pilot carriers arranged in the OFDM signal at regular intervals frequencywise and timewise. The amplitude and phase of the pilot carriers are known, and thus the changes in amplitude and phase are regarded as having been given by the fluctuation in the transmission line to estimate a transmission line characteristic (the degree of deviation in amplitude and phase), and the power amount of all the OFDM carriers are calculated.

However, when a noise signal, particularly a frequency-selective disturbing signal, has been added to the pilot signal for an OFDM signal, the amplitude and phase of the pilot carrier fluctuate as well, causing an error in estimating a transmission line characteristic. Meanwhile, a signal transmitted with the data carrier of the OFDM signal is calculated by dividing the received data by the transmission line characteristic estimated from the pilot carrier. Accordingly, an error occurs in the signal of the data carrier as well.

Further, even when a noise signal with its characteristic different from that of an OFDM signal is added only to the data carrier signal for the OFDM signal, an error occurs in the data carrier signal. When using a signal OFDM-modulated and received by multiple antennas, with being selected or synthesized by means of space diversity reception, a signal with incorrect information results in being selected or synthesized if a signal received by at least one antenna is affected by the above-mentioned noise signal, potentially causing a deteriorated reception characteristic on the contrary.

SUMMARY OF THE INVENTION

In order to solve the above-mentioned problems, a receiving device according to the present invention is one that receives a signal carrier-modulated with digital multivalued modulation, by multiple antennas, and demodulates the signal, having a demodulating unit that outputs complex information indicating signal points of signals received by multiple antennas; a reliability judging unit that compares the distance between the signal points of received signals calculated from the complex signal, with a threshold preliminarily stored, to output a judgment result; a synthesizing unit that outputs reliability information based on the judgment result to synthesize the received signals using complex information input from the demodulating unit; a demapping unit that restores bit data to its original state from the received signals having been synthesized, and at the same time calculates likelihood for each bit to output likelihood corrected based on the reliability information; and an error correcting unit that corrects an error in the bit data according to the likelihood.

With the above-mentioned makeup, when performing a diversity process that receives by multiple antennas signals modulated and transmitted with digital multivalued modulation, and selects or synthesizes received signals after the processes ending with demodulation are performed for each signal, the reception performance of the diversity antennas can be maintained even if at least one received signal is affected by a noise signal.

BRIEF DESCRIPTION OF THE DRAWINGS

FIG. 4 illustrates a method of restoring bit data to its original state according to the first exemplary embodiment of the present invention.

FIG. 8 is another block diagram illustrating the makeup of a diversity receiving device according to the second exemplary embodiment of the present invention.

DETAILED DESCRIPTION OF PREFERRED EMBODIMENT

First Exemplary Embodiment

First, a description is made for an example device configuration for realizing diversity reception method according to the present invention. In the first exemplary embodiment, the diversity receiving device is assumed to have two antennas.

Figure 1:
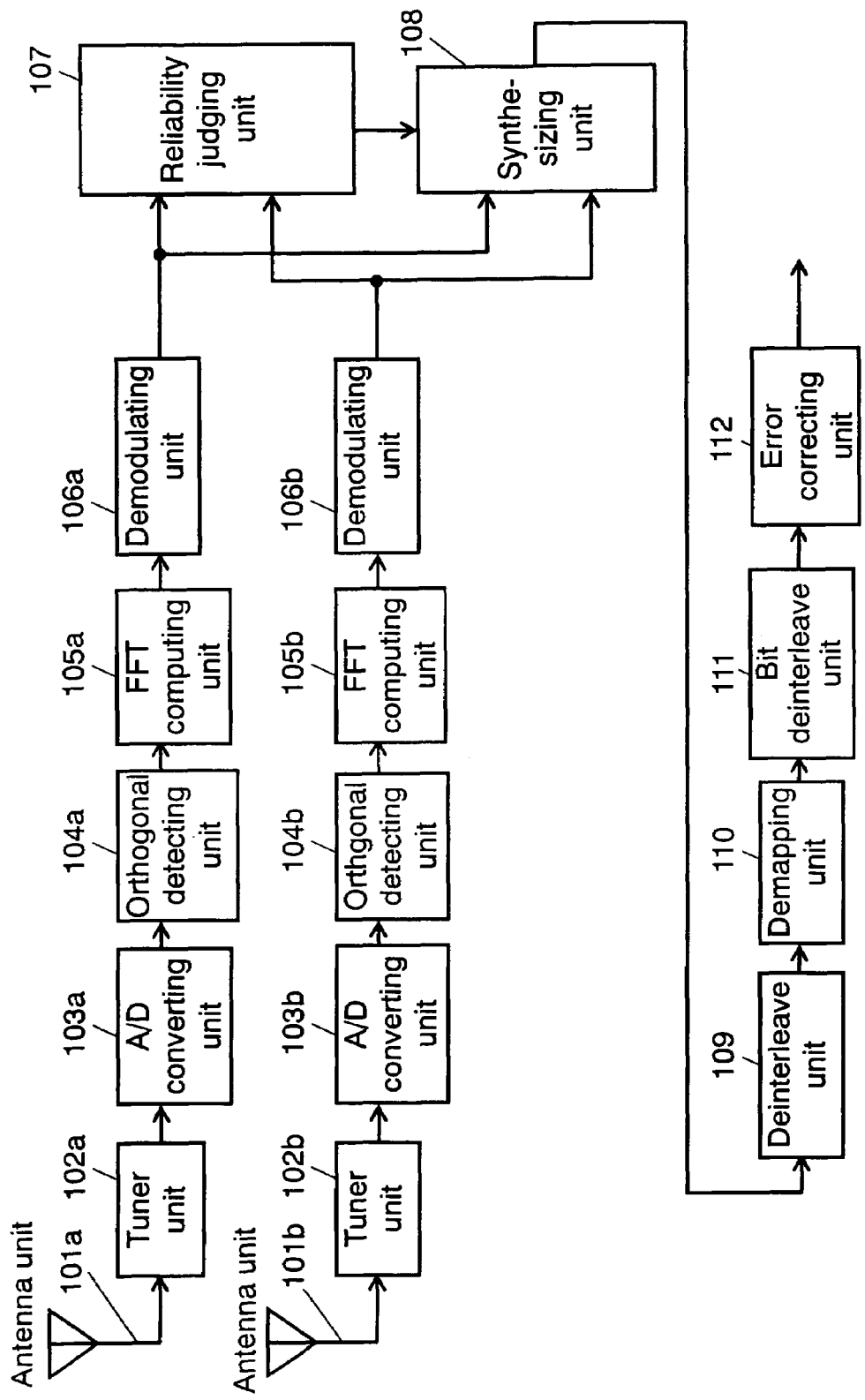
FIG. 1 is a block diagram illustrating the makeup of a diversity receiving device according to the first exemplary embodiment of the present invention.

FIG. 1 is a block diagram illustrating an example makeup according to an embodiment of the present invention.

Hereinafter, a description is made for the action taking as an example diversity reception method that transmits a received signal with multicarriers, like an OFDM transmission signal, and synthesizes signals modulated with 16QAM (Quadrature Amplitude Modulation) to create each carrier.

Antenna unit 101a converts airwaves transmitted from a broadcast station to electric signals and outputs them. Tuner unit 102a extracts signals in a specific frequency band from signals obtained from antenna unit 101a to convert them to those in a base band or a certain frequency band. A/D converting unit 103a converts analog signals obtained from the tuner to digital signals. Orthogonal detecting unit 104a detects an OFDM transmission signal, calculates a frequency error between a transmission signal and a frequency reference signal set in the demodulating unit and corrects the transmission signal, calculates a symbol period in frequency OFDM and a guard interval period, to output a signal in the OFDM symbol period. Further, orthogonal detector 104a judges the transmission mode for the OFDM transmission signal and the length of the guard interval period.

FFT computing unit 105a performs an FFT computing process for a time-domain signal in an OFDM symbol period obtained from orthogonal detector 104a, to convert it to a frequency-domain one.

Demodulating unit 106a demodulates a TMCC (Transmission and Multiplexing Configuration and Control) signal inserted to an OFDM signal and obtains various types of parameter information on the OFDM transmission signal.

Moreover, demodulating unit 106a extracts pilot signals arranged frequencywise and timewise at regular intervals in the OFDM signal. Demodulating unit 106a compares an extracted pilot signal with a reference value (known amplitude and phase) to calculate the transmission line characteristic (the degree of deviation in amplitude and phase) of a carrier in which a pilot signal has existed, from the change in amplitude and phase. Next, interpolation is performed timewise and frequencywise for a carrier in which the pilot signal calculated by the pilot extracting unit has existed, to calculate an estimate for the transmission line characteristics of all the OFDM carriers and to output it. The interpolation is performed using the transmission line characteristic of the pilot carrier, such as by sequentially increasing or decreasing according to the number of data carriers existing between pilot carriers, or by consolidating with an average value. Then, a signal obtained from FFT computing unit 105a is divided by the estimate for the transmission line characteristic, to calculate a complex signal based on the division result for outputting the complex signal to reliability judging unit 107 and synthesizing unit 108.

Further, demodulating unit 106a outputs to reliability judging unit 107 and synthesizing unit 108 the power information of each OFDM carrier, calculated using the transmission line characteristic estimated from the pilot signal.

The makeup of antenna unit 101b through demodulating unit 106b are the same as those of above-mentioned antenna units 101a through 106a, and thus the respective descriptions are omitted.

Reliability judging unit 107 obtains power information indicating the power levels of complex signals from demodulating units 106a and 106b, and of an OFDM carrier that has sent the complex signal, to calculate the distance between output signal points.

Here, FIGS. 2 and 3 are plan views mapped thereon with complex signals having been input from demodulating units 106a and 106b.

Hereinafter, a description is made for a case where the output signals from both demodulating units 106a and 106b have not been affected by a high-level noise signal, with reference to FIGS. 2A, 2B, and 2C.

Figure 2A:
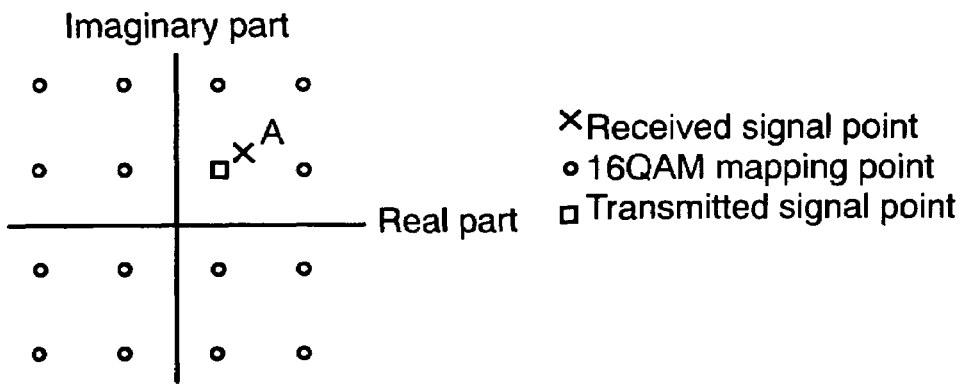
FIG. 2A illustrates a complex signal in the first exemplary embodiment of the present invention.

Symbol A in FIG. 2A indicates a complex signal received by antenna unit 101a and obtained from demodulating unit 106a. Symbol B in FIG. 2B indicates a complex signal received by antenna unit 101b and obtained from demodulating unit 106b. Symbol Y in FIG. 2C indicates the result of signals A and B in FIGS. 2A and 2B, respectively, having been synthesized.

Reliability judging unit 107 calculates the distance between output signal point A of demodulating unit 106b and output signal point B of demodulating unit 106a, and then compares the distance with a threshold preliminarily set. Here, the threshold is assumed to be twice the minimum distance between 16QAM mapping points.

Assuming that the coordinates of 16QAM mapping points are +3, +1, −1, and −3, the minimum distance between the mapping points is 2 and the threshold is 4. This threshold is compared with the distance between signal points A and B (referred to as "distance between received signal points A and B" hereinafter).

Figure 2B:
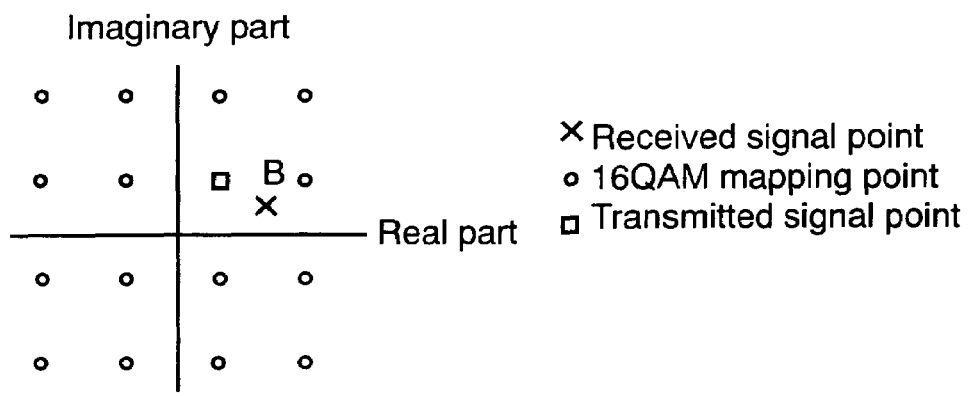
FIG. 2B illustrates a complex signal in the first exemplary embodiment of the present invention.
Figure 2C:
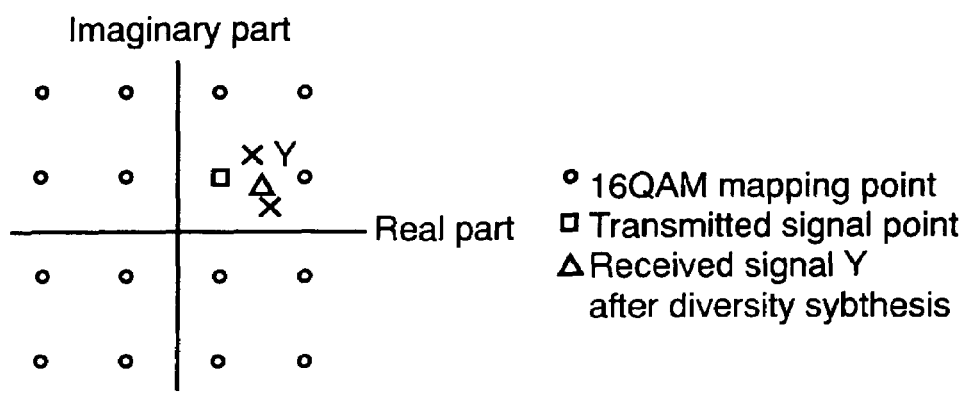
FIG. 2C illustrates a complex signal in the first exemplary embodiment of the present invention.

If the received signal point is as in FIGS. 2A and 2B, reliability judging unit 107 judges that the distance between received signal points A and B is smaller than the threshold preliminarily set, and outputs the judgment result to synthesizing unit 108. In this case, the judgment result may be anything such as information indicating that the distance between received signal points A and B is smaller than the threshold, or a "pass" determination.

Synthesizing unit 108 obtains a complex signal and power information from demodulating unit 106a in the same way as in reliability judging unit 107. Synthesizing unit 108 obtains a complex signal and power information from demodulating unit 106b as well. Then, synthesizing unit 108 synthesizes complex signals obtained from demodulating units 106a and 106b. When synthesizing, the signals are added after being weighted according to $\alpha$, the power amount of the carrier that has transmitted the received signal calculated by demodulating unit 106a; and $\beta$, the power amount of the carrier that has transmitted the received signal calculated by demodulating unit 106b. Power amounts $\alpha$ and $\beta$ may be quantized values.

Here, the weighting amount for received signal point A in FIG. 2A is $\alpha/(\alpha+\beta)$, and that for B is $\beta/(\alpha+\beta)$, for example. Signal point Y obtained as a result of the synthesis is as in FIG. 2C.

Synthesizing unit 108 outputs to deinterleave unit 109 at the subsequent stage, complex signal information on received signal point Y after being synthesized and reliability information. In FIGS. 2A, 2B, and 2C, in order to obtain from reliability judging unit 107 a judgment result that the distance between received signal points A and B is smaller than the threshold or a "pass" determination has been made, reliability information such as received power information on both received power amount $\alpha$ of received signal A and received power amount $\beta$ of received signal B, or on the larger one is output from synthesizing unit 108, for example.

Figure 3A:
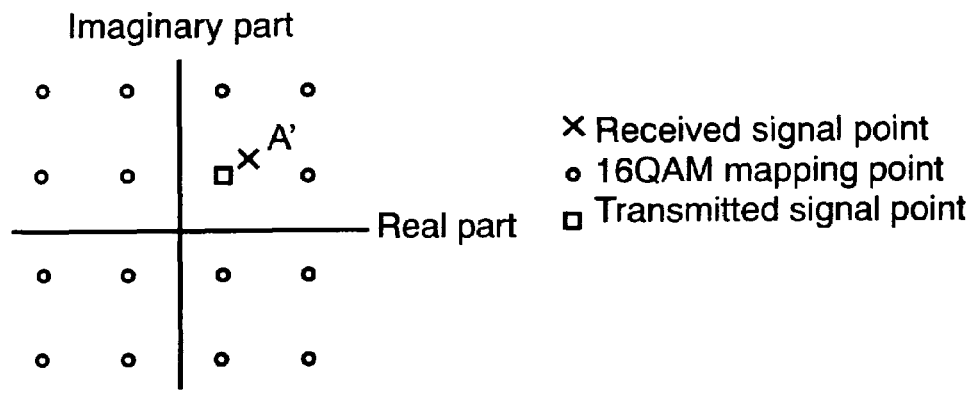
FIG. 3A illustrates a complex signal in the first exemplary embodiment of the present invention.
Figure 3B:
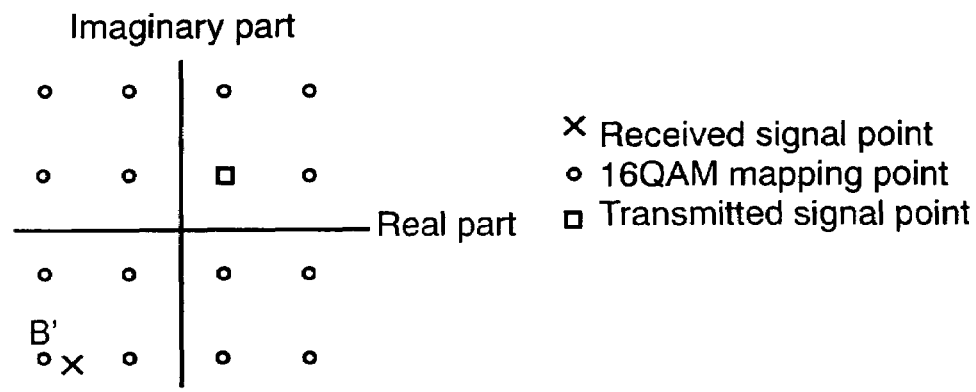
FIG. 3B illustrates a complex signal in the first exemplary embodiment of the present invention.
Figure 3C:
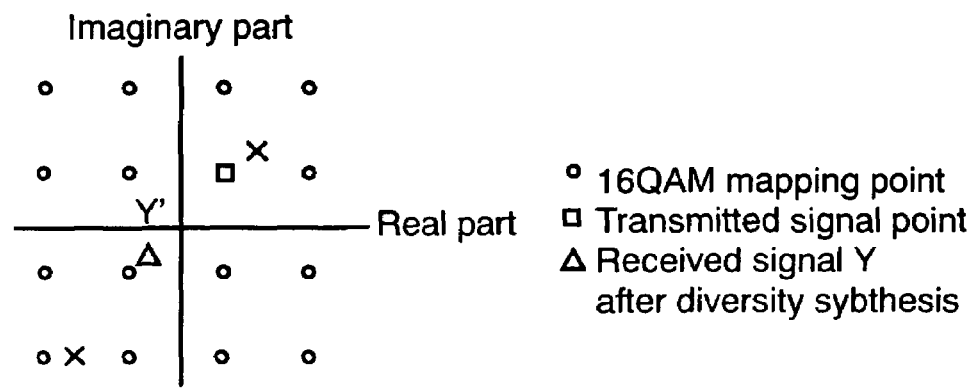
FIG. 3C illustrates a complex signal in the first exemplary embodiment of the present invention.

Next, a description is made for a case where either of the output signals from demodulating units 106a and 106b has been affected by a high-level noise signal, with reference to FIGS. 3A, 3B, and 3C.

A' in FIG. 3A is a complex signal that has been received by antenna unit 101a and obtained from demodulating unit 106a. B' in FIG. 3B is a complex signal that has been received by antenna unit 101b and obtained from demodulating unit 106b. Y' in FIG. 3C is a result of synthesizing signals A' and B' in FIGS. 3A and FIG. 3B, respectively.

Reliability judging unit 107 calculates the distance between signal point A' of the signal output from demodulating unit 106a and B' from demodulating unit 106b (referred to as "distance between received signals A' and B'" hereinafter). Then, the distance is compared with a threshold preliminarily set. As mentioned above, the threshold in the first exemplary embodiment is 4, and thus when the received signal point is as shown in FIGS. 3A and 3B, the distance between received signals A' and B' is judged as being larger than the threshold preliminarily set, and the judgment result is output to synthesizing unit 108. The judgment result in this case may be anything such as information indicating that the distance between received signal points A and B is larger than the threshold, or a "fail" determination, in the same way as the above.

Synthesizing unit 108 obtains a complex signal and power information from demodulating unit 106a, in the same way as in reliability judging unit 107. Synthesizing unit 108 obtains a complex signal and power information from demodulating unit 106b as well. Then, synthesizing unit 108 synthesizes complex signals obtained from demodulating units 106a and 106b. When synthesizing, the signals are added after being weighted according to $\alpha'$, the power amount of the carrier that has transmitted the received signal calculated by demodulating unit 106a; and $\beta'$, the power amount of the carrier that has transmitted the received signal calculated by demodulating unit 106b.

Here, the weighting amount for received signal point A' in FIG. 3A is $\alpha'/(\alpha'+\beta')$, and that for B' is $\beta'/(\alpha'+\beta')$, for example. Signal point Y' obtained as a result of the synthesis is as in FIG. 3C.

Synthesizing unit 108 outputs to deinterleave unit 109 at the subsequent stage, complex signal information on received signal point Y' after being synthesized and reliability information. In FIGS. 3A, 3B, and 3C, in order to obtain from reliability judging unit 107 a judgment result that the distance between received signals A' and B' is larger than the threshold or a "fail" determination has been made, reliability information such as 0, indicating the lowest reliability, is output from synthesizing unit 108.

Deinterleave unit 109 rearranges frequencywise and timewise a complex signal of the received signal point after synthesis obtained from synthesizing unit 108. The method of rearranging, preliminarily defined, is to restore the rearrangement made by the transmission side.

Demapping unit 110 restores bit data of a signal to its original state based on information on the received signal point obtained from deinterleave unit 109. Bit data is restored with the assumption that the code string allocated to the mapping point closest to the received signal point was the transmitting code string. In the first exemplary embodiment for example, if the received signal has been carrier-modulated with 16QAM modulation, bit data is restored according to the rule as shown in FIG. 4. In this case, calculation is made for the shortest distance between a mapping point with its transmitting code point 0 for its received signal point, and that with 1, for each bit, and the value determined according to the distance is transmitted to the error correcting unit at the subsequent stage, as likelihood ("likelihood of 0," "likelihood of 1"), which is called "soft decision."

When calculating likelihood, the above likelihood is corrected using reliability information obtained from synthesizing unit 108 through deinterleave unit 109. As described using FIGS. 3A, 3B, and 3C, if the distance between received signals A' and B' is larger than the threshold, and synthesizing unit 108 has judged that reliability is zero, the likelihood is corrected to 0 ("Likelihood of 0" equals "likelihood of 1".) Meanwhile, as described using FIGS. 2A, 2B, and 2C, if the distance between received signals A' and B' is smaller than the threshold, and synthesizing unit 108 has judged that reliability is high, the likelihood calculated is output without being corrected. Alternatively the reliability value, which is power information on the carrier obtained from synthesizing unit 108, is multiplied by the likelihood preliminarily obtained, and the result is output.

In this way, demapping unit 110 calculates bit data string obtained from information on the reception point obtained from synthesizing unit 108, and likelihood for each bit, and outputs the results.

Next, the bit deinterleave unit rearranges output from demapping unit 110. The method of rearranging, preliminarily defined, is to restore the rearrangement made by the transmission side.

Error correcting unit 112 performs error correction using a bit data string obtained from bit deinterleave unit 111 and information on likelihood for each bit data. In this case, the error correction method called "Viterbi decoding" is frequently used, which "Reed-Solomon correction code" is often combined with, but not limited to this method. Any method may be used as long as it uses the aforementioned likelihood.

The above method enables preventing the following problem. That is, when performing a diversity process that receives by multiple antennas a signal transmitted with 16QAM modulation method, and after performing the processes ending with demodulation for each signal, selects or synthesizes the signals, the position of the reception point largely separates from that of the transmission point because at least one received signal is affected by a noise signal, and as a result of synthesizing the signals including one affected by a noise signal, the position of the reception point is estimated as a position away from the transmission point on the contrary.

Meanwhile, if all the received signals are affected by a disturbing signal, reliability information on the received signal to be transmitted to the error correcting unit at a stage subsequent to the synthesizing unit can be set low, and thus preventing degration in reception performance due to a disturbing signal.

In the first exemplary embodiment, the description is made for a case of two antennas. However, the present invention is feasible for three or more antennas.

Further in the first exemplary embodiment, the description is made for a case of OFDM and 16QAM as the transmission system and digital modulation method, respectively, but not limited to them. The transmission system may be a transmission by a single carrier such as VSB (Vestigial Side Band). The modulation method may be any method such as 8QAM, 32QAM, 64QAM, 256QAM, or QPSK (Quadrature Phase Shift Keying), as long as it recognizes information on the distance between reception points.

Meanwhile in the first exemplary embodiment, demodulating unit 106 outputs power information on an OFDM carrier to reliability judging unit 107 and synthesizing unit 108. However, the amplitude of the data carrier obtained by dividing by an estimate for the transmission line characteristic of the carrier may be output. In this case, synthesizing unit 108 results in synthesizing complex signals based on the amplitude of the data carrier.

The description is made for a case of the threshold that is twice the distance between 16QAM mapping points, but not limited to this. An arbitrary value can be set as well such as 1.5 or 3 times the distance between mapping points. The distance between mapping points may be adjusted to an arbitrary value according to reception conditions or a carrier modulation method such as 8QAM, 32QAM, 64QAM, 256QAM, or QPSK.

The threshold may be calculated based on the C/N characteristic of the received signal. In this case, the average power amount of a noise signal is obtained from the C/N characteristic of the received signal, and thus the value of twice the average power amount of the noise signal, for example, can be set as the threshold, but not limited to this value. An arbitrary value can be set such as 1.5 or 3 times the average power amount.

Thus far, the description is made for the method that compares the distance between received signal points with the threshold and corrects the likelihood using the judgment result. However, synthesizing unit 108 may correct reliability information according to the distance between received signal points, and output the information. In this case, synthesizing unit 108 inputs the distance between received signal points calculated by reliability judging unit 107, and corrects the reliability lower and higher if the distance between received signal points is long and short, respectively. Nevertheless, it is adequate only to correct the reliability of a received signal lower according to the distance between received signal points.

Moreover, an accumulating unit for accumulating information on the distance between received signal points for a certain period of time may be provided separately. This accumulating unit allows comparing the average value of the distances between received signal points with the threshold, and comparing the average value of the distances between reception points, as the threshold, with the distance between received signal points.

When comparing the average value of distances between received signal points with the threshold, the accumulating unit accumulates information on the distance between received signal points calculated by reliability judging unit 107 for a certain period of time, and always calculates an average value of distances between reception points using this information. Reliability judging unit 107 compares the average value of distances between received signal points received from the accumulating unit with a threshold preliminarily set.

Here, the period and range in which the accumulating unit accumulates information on the distance between received signal points can be arbitrarily set according to reception conditions. Calculating an average value of several carriers frequencywise and hundreds of symbols timewise, for example, enables increasing detection accuracy for a frequency-selective disturbing signal.

An average value of distances between received signal points, as a threshold, can be as well compared with the distance between received signal points. If a received signal is composed of multiple carriers, like an OFDM signal, a threshold to be used in reliability judging unit 107 can be calculated by averaging an arbitrary number of distances between received signal points picked up on the frequency axis and time axis. An average value is calculated using information on distances between reception points for several hundreds or several thousands of carriers frequencywise and several hundreds or several thousands of symbols timewise. This method enables an average value calculated corresponding to the amount of disturbing signals included in the signal received, to be set as a threshold. In this case, the integral multiple or fraction multiple of the average value may be set as a threshold as well, instead of the average value as is.

In this example, an accumulating unit is provided in addition to reliability judging unit 107. However, this function may be provided inside reliability judging unit 107.

As a result of the above process, if a frequency-selective disturbing signal is being added continuously to a specific carrier, judgment can be made that the relevant carrier is affected by the disturbing signal, even if the distance between signals affected by the disturbing signal is accidentally short.

In the first exemplary embodiment, the distance between received signal points is to be calculated. However, the following method can be used as well. That is, the method estimates the received signal point as the closest mapping point (referred to as "hard decision"), calculates the distance between such mapping points, and compares the distance with the threshold to output a judgment result.

Further, the following method can be used as well. That is, synthesizing unit 107 outputs to reliability judging unit 108, information on the complex signal for the received signal synthesized; and reliability judging unit 108 measures the distance between the received signal synthesized and the received signal point, instead of the distance between received signal points, and compares this distance with a threshold preliminarily stored. This method enables excluding from the choices only received signal points far away from the received signal point after synthesis.

Furthermore, the following method can be used as well. That is, synthesizing unit 107 outputs to reliability judging unit 108 information on a complex signal for the received signal synthesized; and reliability judging unit 108 multiplies the distance between the received signal synthesized and the received signal point, by the power information, instead of the distance between received signal points, compares this distance with a threshold preliminarily stored, and outputs the judgment result. Multiplying by the power information prevents the following problem. That is, as a result that the received signal point is separated from the transmitted signal point under the influence of noise due to a small power amount of the carrier, the distance between received signal points is indicated longer than it really is. For a carrier affected by a frequency-selective disturbing signal, judgment can be prevented that the information on the distance between received signal points is longer than it really is due to a large power amount of the carrier. In this way, a carrier affected by a frequency-selective disturbing signal can be properly discriminated.

Second Exemplary Embodiment

Next, a description is made for an example case where a diversity receiving device has three or more antennas.

Figure 5:
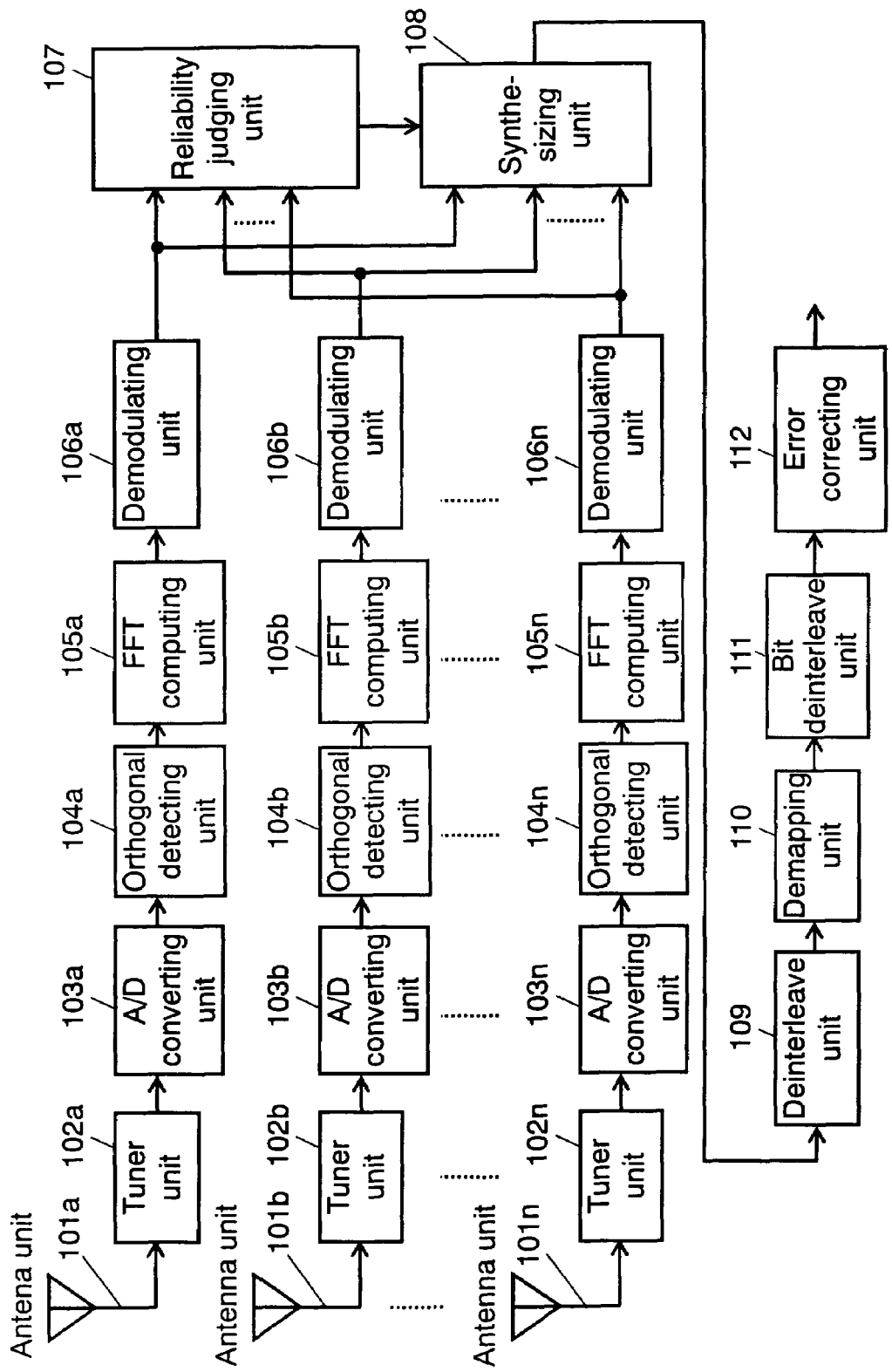
FIG. 5 is a block diagram illustrating the makeup of a diversity receiving device according to the second exemplary embodiment of the present invention.
Figure 6A:
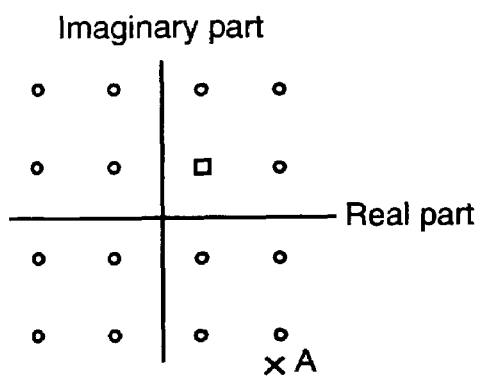
FIG. 6A illustrates a complex signal in the second exemplary embodiment of the present invention.
Figure 6B:
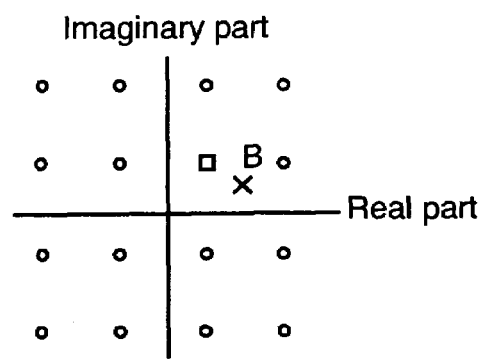
FIG. 6B illustrates a complex signal in the second exemplary embodiment of the present invention.
Figure 6C:
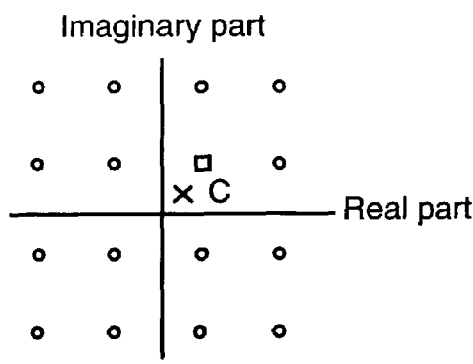
FIG. 6C illustrates a complex signal in the second exemplary embodiment of the present invention.
Figure 6D:
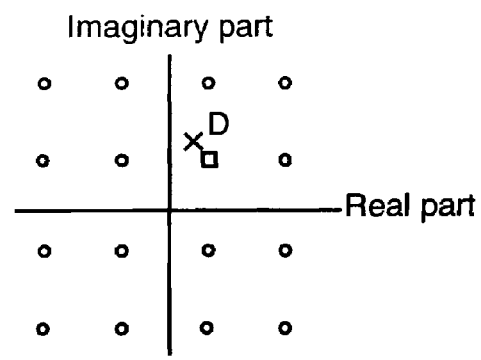
FIG. 6D illustrates a complex signal in the second exemplary embodiment of the present invention.

FIG. 5 is a block diagram illustrating the makeup of a diversity receiving device according to the second exemplary embodiment. Each component in FIG. 5 is the same as in the first exemplary embodiment of the present invention, and thus its description is omitted.

In the second exemplary embodiment, reliability judging unit 107 receives N pieces of complex signals input in parallel from demodulating units 106a through 106n, and calculates respective distances between complex signals A through N received.

Addition is made for the distances with which a received signal point itself is an origin, out of the distances between received signal points calculated, and compares this sum with the threshold to judge for distance. Because the judgment for distance is made for each complex signal, reliability judging unit 107 outputs "pass" as the judgment result if not fewer than half of the complex signals are judged as within the threshold (majority rule), and "fail" if fewer than half.

In a 4-branch diversity receiving device, for example, the following values are calculated for complex signals A, B, C, and D.

$$f(a)=l(AB)+l(AC)+l(AD)$$

$$f(b)=l(BA)+l(BC)+l(BD)$$

$$f(c)=l(CA)+l(CB)+l(CD)$$

$$f(d)=l(DA)+l(DB)+l(DC)$$

("l" indicates the distance between received signal points.)

Judgment for distance is made by comparing these values with the threshold preliminarily determined. As a result of the judgment for distance, "pass" is output to synthesizing unit 108 if two or more distances are within the threshold.

Reliability judging unit 107 further outputs to synthesizing unit 108 the judgment result for distance for each complex signal. In the above example for 4-branch diversity, the comparison result of each of f(a), f(b), f(c), and f(d), with the threshold is output to synthesizing unit 108 as the judgment result for distance.

Figure 7:
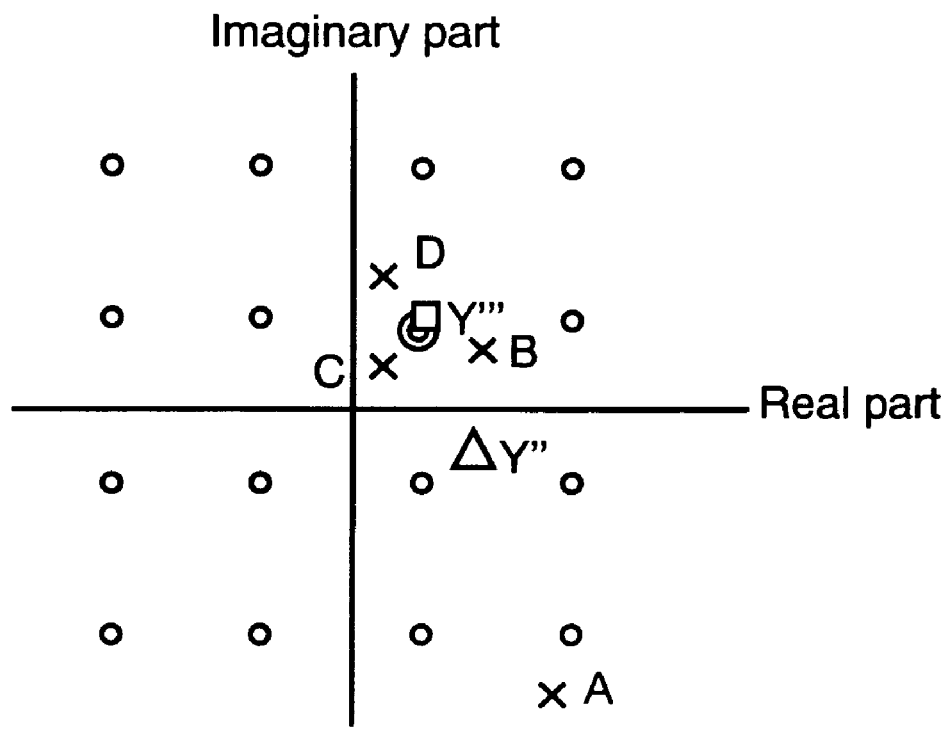
FIG. 7 is another figure illustrating a complex signal in the second exemplary embodiment of the present invention.

Synthesizing unit 108 synthesizes complex signals obtained from demodulating units 106a through 106n, according to the weighting amount calculated from the power amount of the carriers obtained from the same demodulating units 106a through 106n. In this case, synthesizing unit 108 adjusts the weighting amount based on the judgment result for distance received from reliability judging unit 107. The power amount is set to "0" if information has been received indicating that the judgment result for distance is equal to or larger than the threshold, for example. As shown in FIGS. 6 and 7, in the example for 4-branch diversity, if only the judgment result for distance: f(a) is equal to or larger than the threshold, assuming the power amount of f(a) through f(d) are $\alpha$, $\beta$, $\gamma$, and $\epsilon$, respectively, the weighting amounts of f(a) through f(d) are $0/(\alpha+\beta+\gamma+\epsilon)$, $\beta/(\alpha+\beta+\gamma+\epsilon)$, $\gamma/(\alpha+\beta+\gamma+\epsilon)$, and $\epsilon/(\alpha+\beta+\gamma+\epsilon)$, respectively.

Otherwise, a complex signal synthesized based on the judgment result for distance can be selected as well in synthesis. In the example for 4-branch diversity, assumption may be made that f(a) is not used for synthesis and power amount $\alpha$ is counted out in weighting amount.

It is the same as in the description for the first exemplary embodiment that synthesizing unit 108 outputs reliability information based on a judgment result obtained from reliability judging unit 107.

This method enables preventing the following problem. That is, when performing a diversity process that receives by multiple antennas a signal transmitted with multivalued QAM modulation method, and after performing the processes ending with demodulation for each signal, selects or synthesizes the signals, the position of the reception point largely separates from that of the transmission point because at least one received signal is affected by a noise signal, and as a result of synthesizing the signals including one affected by a noise signal, the position of the reception point is estimated as a position away from the transmission point on the contrary.

In other words, the following method enables preventing degration in reception performance due to a disturbing signal. That is, if some received signals have been affected by a disturbing signal, the method selects by majority rule received signals estimated as not being affected by a disturbing signal, and synthesizes with increasing the weighting amount for such received signals or with using only such received signals.

In the second exemplary embodiment, reliability judging unit 107 is to output to synthesizing unit 108 "pass" as the judgment result if not fewer than half of the complex signals are judged as within the threshold. Here, the percentage of distances that are within the threshold with which judgment is made as "pass" is arbitrarily determined. The higher the percentage is, the higher the "pass" criterion is.

Further in the second exemplary embodiment, reliability judging unit 107 sums the distances with which a received signal point itself is an origin, out of the distances between received signal points calculated, and compares this sum with the threshold to judge for distance, but not limited to this means. Besides, any means can be used as long as it can select complex information with high reliability out of multiple pieces of complex information obtained. For example, as a result that judgment for distance is individually made by comparing each distance between other complex signals received, with the threshold, received complex signals can be selected based on the number of judgment results of individual distances that are "pass". In the example for 4-branch diversity, only the distance between received signal points A and B exceeds the threshold. In this case, judgment results for individual distances are expressed as follows, where a "o" mark indicates "within the threshold" and a "x" mark, "exceeding the threshold":

$(l(AB), l(AC), l(AD))=(x, o, o)$      A:

$(l(BA), l(BC), l(BD))=(x, o, o)$      B:

$(l(CA), l(CB), l(CD))=(o, o, o)$      C:

$(l(DA), l(DB), l(DC))=(o, o, o)$      D:

At least one "x" mark exists in the judgment results for individual distances, the distance between the two received signal points is judged as "fail." In this case, the distance between received signal points A and B mentioned above is judged as "fail." However, the judgments for two received signal points out of the four are "pass", and thus the judgment result is "pass" (majority rule).

In this case, the following method may be used. That is, the method counts the number of "o" marks obtained from the judgment result for individual distances for each received signal point, weights the judgment result according to the count, and synthesizing unit 108 to which the judgment result for distances is input uses the judgment result as a guide to adjust the weighting amount when synthesizing. A possible weighting amount is $(2/3)\times[\alpha/(\alpha+\beta+\gamma+\epsilon)]$, $(2/3)\times[\beta/(\alpha+\beta+\gamma+\epsilon)]$, $(2/3)\times[\gamma/(\alpha+\beta+\gamma+\epsilon)]$, or $(2/3)\times[\epsilon/(\alpha+\beta+\gamma+\epsilon)]$.

In this case, a received signal point for which not fewer than half of judgment results for individual distances are "fail" can be weighted as "0" or excluded from the choices.

Here, in the second exemplary embodiment, examination is made for a case where received signal points have dispersed to multiple positions. Judgment results for individual distances between the aforementioned received signal points compared individually with the threshold are expressed as follows:

$(l(AB), l(AC), l(AD))=(x, x, o)$      A:

$(l(BA), l(BC), l(BD))=(x, o, x)$      B:

$(l(CA), l(CB), l(CD))=(x, o, x)$      C:

$(l(DA), l(DB), l(DC))=(o, x, x)$      D:

Such judgments can occur if points A through D are mapped to the four corners of a rectangle. In this case, all received signal points A, B, C, and D are to include two "x" marks as judgment results for individual distances, and thus the judgment results for distance are all "fail" for received signal points A through D. Consequently, the judgment result output from reliability judging unit 107 is "fail" as well. Synthesizing unit 108 is to correct the likelihood in demapping unit 110 with the reliability information being "0" from this judgment result, thus enabling degration in reception performance to be prevented.

Furthermore, in the same way as in the first exemplary embodiment, as a result of providing an accumulating unit for accumulating information on the distance between received signal points for a certain period of time, an average value of the distances between received signal points or an average value of the sum total of the distances between received signal points can be set as the threshold as well. In this case, the integral multiple or fraction multiple of the average value may be set as the threshold, in the same way as in the first exemplary embodiment.

Further, reliability judging unit 107 may store the sum total of the distances between received signal points for the signals received in past times, calculate an average value of the sum total of the distances between received signal points, and compare this average value with the threshold preliminarily stored, to output a judgment result.

In the second exemplary embodiment, which is to calculate distances between received signal points and the sum total of the distances, the following method can be used as well. That is, the method estimates the received signal point as the closest mapping point (hard decision), calculates the distances between mapping points and the sum total of the distances, and compares these values with the threshold to output a judgment result.

Hereinbefore, the description is made for the method that compares the distances between received signal points with the threshold, and corrects the likelihood using the judgment result. However, in the same way as in the first exemplary embodiment, the synthesizing unit may correct reliability information according to the distances between received signal points or the sum total of the distances.

FIG. 8 is a block diagram illustrating the makeup of a diversity receiving device with interference detector 113 further added to the above-mentioned makeup.

In this example, demodulating unit 106a calculates the distance between a received signal point, and the mapping point closest to the received signal point, and calculates a dispersion value from the previous distance information to output it. Interference detector 113a compares this dispersion value input from demodulating unit 106a, with the threshold. A carrier being affected by frequency-selective interference has a high probability of separating from its mapping point, with the dispersion value tending to increase, and thus a carrier with its dispersion value larger than the threshold can be judged as being affected by interference.

Interference detector 113a outputs to reliability judging unit 107 a result of comparison with a threshold, as binary or multivalued information, the result indicating whether each OFDM carrier is affected by interference. If the comparison result is output as multivalued information, the degree of interference can be output as information on the amount of interference. Interference detectors 113b through 113n operate in the same way, and thus their descriptions are omitted here.

Reliability judging unit 107 sets reliability information to a low level if at least one of the already described judgment result and the comparison result in interference detector 113*a* through 113*n*, is judged as "interference exists." This method allows adjusting the likelihood based on both the distance between a received signal point and its mapping point, and the distance between received signal points, thus enabling a diversity receiving device more resistant to a disturbing signal to be implemented.

In this case, as a result that synthesizing unit 108 excludes carriers that have been judged as "interference exists" in at least one of the already described judgment result and the comparison result in interference detector 113*a* through 113*n*, or sets weighting amount in synthesizing to a low level, the same effect can be obtained as well.

Here, the description is made for the example combination with interference detectors 113*a* through 113*n*, using the second exemplary embodiment. However, combination with interference detectors 113*a* through 113*n* is possible as well in the first exemplary embodiment.

Hereinbefore, in the first and second exemplary embodiments, the description is made for diversity receiving devices and their receiving methods according to the present invention. As a result that these receiving methods are incorporated as software to a receiving device such as a personal computer, television set, VCR, or STB (Set-top Box), with a built-in antenna or connected to an antenna, and are processed and executed by a CPU (Central Processing Unit) provided in a PC or the like, diversity reception with selection and synthesis can be implemented.

In order for the above-mentioned CPU provided in a PC or the like to process and execute the receiving methods in the first and second exemplary embodiments, these methods may be stored in a recording medium such as a CD-ROM as a program or quasi-program data in a CPU-executable form, which means a PC or the like equipped with a reading device can implement the above-mentioned method.

INDUSTRIAL APPLICABILITY

The present invention allows reception performance of a diversity receiving device to be maintained even if a received signal is affected by a noise signal, which is therefore industrially applicable as a diversity receiving device.

The invention claimed is:

1. A diversity receiving device that receives a plurality of signals carrier-modulated with Quadrature Amplitude Modulation, and selects or synthesizes the signals, comprising:
   a plurality of demodulating units, each for demodulating an input signal and outputting a complex signal;
   a reliability judging unit for calculating a sum of distances among signal points, each signal point being a point in a complex coordinate corresponding to a complex signal input from a respective demodulating unit, the reliability judging unit for comparing a sum of the distances with a given threshold, and outputting a judgment result; and
   a synthesizing unit for performing at least one of (1) selecting at least one signal, and (2) selecting and synthesizing two or more signals according to the judgment result.

2. A diversity receiving device that receives a plurality of signals carrier-modulated with Quadrature Amplitude Modulation (QAM), and selects or synthesizes the signals, comprising:
   a plurality of demodulating units, each for demodulating an input signal and outputting a complex signal;
   a reliability judging unit for estimating a QAM mapping point closest to a signal point, the signal point being a point in a complex coordinate corresponding to a complex signal input from a respective demodulating unit, the reliability judging unit for calculating a sum of distances among a plurality of QAM mapping points corresponding to a plurality of input signals, for comparing the sum of the distances with a given threshold, and for outputting a judgment result; and
   a synthesizing unit that performs one of (1) selecting at least one signal, and (2) selecting and synthesizing two or more signals according to the judgment result.

3. The receiving device as claimed in claim 1, wherein the synthesizing unit selects one of the complex signals if the sum of distances is lower than the given threshold.

4. The receiving device as claimed in claim 2, wherein the synthesizing unit selects one of the complex signals if the sum of distances is lower than the given threshold.

5. The receiving device as claimed in claim 1, wherein the synthesizing unit adjusts a weighting amount when synthesizing according to the sum of distances.

6. The receiving device as claimed in claim 2, wherein the synthesizing unit adjusts a weighting amount when synthesizing according to the sum of distances.

7. A diversity receiving device that receives a plurality of signals carrier-modulated with Quadrature Amplitude Modulation, and selects or synthesizes the signals, comprising:
   two demodulating units, each for demodulating a respective input signal of two input signals and for outputting a complex signal;
   a reliability judging unit for calculating a distance between signal points, each signal point being a point in a complex coordinate corresponding to a complex signal input from a respective demodulating unit, the reliability judging unit for comparing the distance with a given threshold, and for outputting a judgment result calculated according to the comparison result;
   a synthesizing unit for outputting reliability information based on the judgment result and synthesizing both of the signal points;
   a demapping unit for restoring bit data to an original state thereof from the synthesized signal and calculating likelihood in restoring; and
   an error correcting unit for performing error correction of the bit data using the likelihood corrected based on the reliability information.

8. The diversity receiving device according to claim 1, wherein the synthesizing unit is for outputting reliability information based on the judgment result, said diversity receiving device further comprising:
   a demapping unit for restoring bit data to an original state from the synthesized signal and calculating likelihood in restoring; and
   an error correcting unit for performing error correction of the bit data using the likelihood corrected based on the reliability information.

9. The diversity receiving device according to claim 2, wherein the synthesizing unit is for outputting reliability information based on the judgment result, the diversity receiving device further comprising:
   a demapping unit for restoring bit data to an original state from the synthesized signal and for calculating a likelihood in restoring; and
   an error correcting unit for performing error correction of the bit data using the likelihood corrected based on the reliability information.

10. The receiving device as claimed in claim 7, wherein the reliability judging unit is for outputting information indicating that reliability is high, as a judgment result, if not fewer than half of the comparison results for each of the signal points is lower than the threshold.

11. The receiving device as claimed in claim 7, wherein the reliability judging unit is for storing distances from the respective signal points to other signal points for a certain previous period and for setting an average value of the distances to a threshold.

12. The receiving device as claimed in claim 8, wherein the reliability judging unit is for outputting information indicating that reliability is high, as a judgment result, if not fewer than half of the comparison results for each of the signal points is lower than the threshold.

13. The receiving device as claimed in claim 9 wherein the reliability judging unit is for outputting information indicating that reliability is high as a judgment result, if not fewer than half of the comparison results for each of the signal points is lower than the threshold.

14. The receiving device as claimed in claim 8, wherein the reliability judging unit is for storing distances from the respective signal points to other signal points for a certain previous period and for setting an average value of the distances to a threshold.

15. The receiving device as claimed in claim 9, wherein the reliability judging unit is for storing distances from the respective signal points to other signal points for a certain previous period and for setting an average value of the distances to a threshold.

* * * * *